United States Patent [19]

Haymore et al.

[11] Patent Number: 4,515,694
[45] Date of Patent: May 7, 1985

[54] CABLE LIFTING MECHANISM FOR SEDIMENTATION DEVICE

[75] Inventors: Ralph B. Haymore; Heinz W. Winter, both of Salt Lake City, Utah

[73] Assignee: Envirotech Corporation, Salt Lake City, Utah

[21] Appl. No.: 490,741

[22] Filed: May 2, 1983

[51] Int. Cl.$^3$ .............................................. B01D 21/18
[52] U.S. Cl. ..................................... 210/531; 212/201
[58] Field of Search ............... 210/525, 529, 530, 531; 212/201; 254/384, 385

[56] References Cited

U.S. PATENT DOCUMENTS

| | | | |
|---|---|---|---|
| 2,368,703 | 2/1945 | Bousman | 210/531 |
| 3,679,063 | 7/1972 | Pate | 210/531 |
| 4,137,170 | 1/1979 | Tateishi | 210/530 |
| 4,424,130 | 1/1984 | King | 210/531 |

*Primary Examiner*—John Adee
*Attorney, Agent, or Firm*—Thomas S. MacDonald; Carl A. Rowold

[57] ABSTRACT

A lifting mechanism for a rake arm and rake structure employed to move sediments settling out from a solids-liquid slurry in a sedimentation tank, includes a fixed center column (27) in the tank and a concentric movable column (28) in telescoping relation to the fixed column. A first series of sheave assemblies (40) are attached to or fixed with respect to the fixed column and a second series of sheave assemblies (51-55) attached to the movable column at a vertically displaced distance from the first series. The respective sheave assemblies may extend in part in an annulus (34) between the fixed and movable columns and are positioned around the peripheries of the respective columns. A continuous cable (45) extends alternately between individual sheaves in each series and the ends of the cable are attached to a vertical take-up drum (38). Rotation of the drum winds up both ends of the cable, shortening the cable spans between the respective series of sheave assemblies thus raising the movable column with respect to the fixed column. The rakes, rake arms (17) and various torque members (14) and drive members (16) are attached to the movable column and are raised in unison by the take-up action of the cable ends by the drum. Spaced vertically extending multiple keys (60) and keyways (51) are affixed to facing surfaces of the fixed and movable column and the multiple sheave assemblies are positioned between the spaced keys and keyways.

26 Claims, 8 Drawing Figures

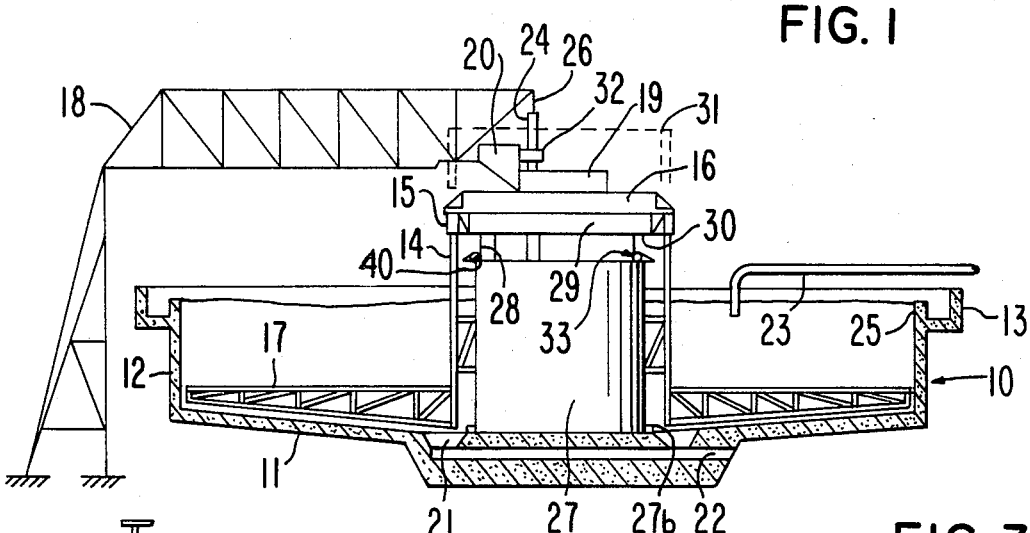
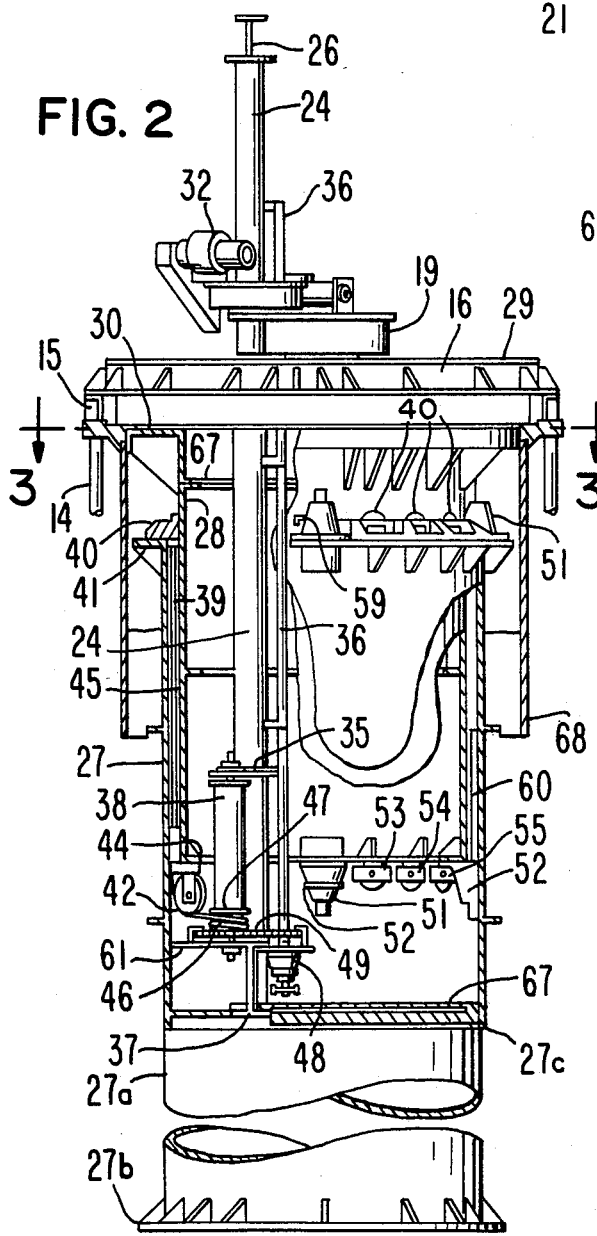
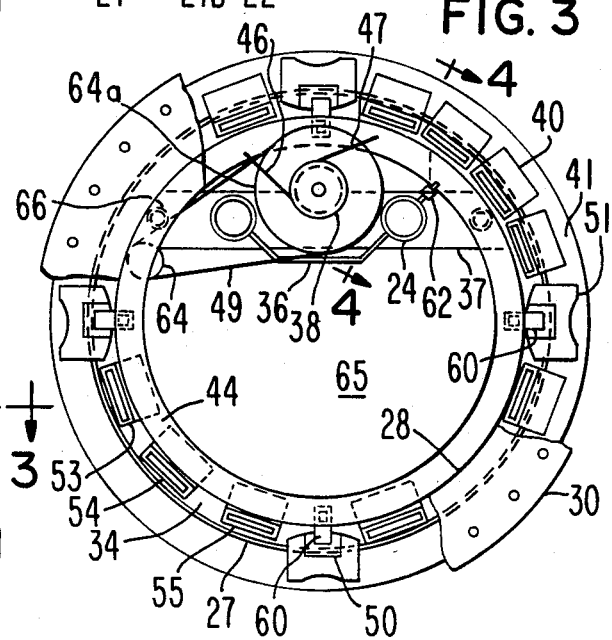
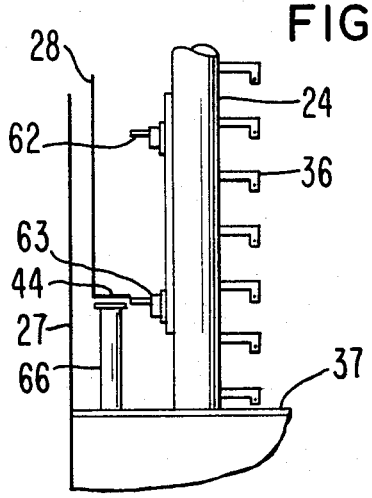

CABLE LIFTING MECHANISM FOR SEDIMENTATION DEVICE

BACKGROUND OF THE INVENTION

1. Field of the Invention

This invention relates to lifting devices employed in solids-liquid sedimentation apparatus to raise and lower rotatable rake arms which engage settled solids within the tank and move the solids to a tank bottom outlet. More particularly, it provides a motorized cable-operated means to lift the rake drive unit with attached rakes above its normal operating position when it is desired to limit the torque applied to such unit and rakes.

2. Description of the Prior Art

Solids-liquid sedimentation apparatus which includes thickeners, clarifiers and the like employ a torque tube or shaft or a motor-driven ring gear or drivehead for driving one or more rake structures contained at a lower level within the sedimentation tank. In normal typical operations the rake(s) with associated blades move settled solids along a slightly conical bottom surface of the tank toward a central outlet where the settled solids are removed by gravity or pumping. A relatively high torque is imposed by the drive means during normal operation, but when an abnormal mass of sediment or an obstruction is encountered, the torque needed to drive the rake structure may be beyond the capability of the drive or the strength of the rake structure. When such an event occurs it is necessary to move the rake structure upwardly so its movement is not impeded by the heavy sediments or obstruction. This is normally done automatically in response to a torque sensor. Further, if power is lost or if it is necessary to shut down the rotation of the rakes for any reason, it is necessary to raise the rake structure above the resulting sediment layer so that the rakes are not "frozen" or "locked-in" the settled solids necessitating digging the solids out from around the rakes.

A relatively simple form of lift device is seen in U.S. Pat. No. 2,724,506 which includes lifting screw attached to a torque shaft which automatically raises the rakes by a camming action to a higher level where the rakes are no longer obstructed. The rakes may also be raised by rotation of the screw by a manually-operated hand wheel. U.S. Pat. No. 2,122,287 shows a similar hand-operated wheel for moving rakes upwardly.

The Bousman U.S. Pat. No. 2,727,628 shows a center column sedimentation device with a rotatable concentric cage therearound, supporting the rake structure. Raynor et al. U.S. Pat. No. 3,200,956 also shows a telescoping column lift device. Bousman U.S. Pat. No. 2,368,703 shows sedimentation apparatus including pulleys secured to the rake arms with cables extending from a rake blade through the pulleys to a winch for lowering or raising the arms. A similar pulley-cable-winch mechanism is utilized for raising an included cone scraper frame. U.S. Pat. No. 3,592,447 shows a pulley-cable-winch arrangement which raises or lowers a grain levelling apparatus from a fixed ceiling point.

At the present time most commercial sedimentation devices utilize one or more jack screws, rotation of which provides relative movement between a center column and a rake-supporting moving column. Such jack-screw devices have large load concentrations on the jack screw(s) and necessitate equalizion of loadings and rotational moments on each screw. Much space is taken up in the center column with the multiple screws and drives and the required bridge and walkway support columns. Further, jack screws inherently have low lift efficiencies of the order of 8-20%.

SUMMARY OF THE INVENTION

This invention is directed to fixed and movable columns within a sedimentation tank with relative telescoping movement of one column being provided by a cable and sheave system attached to the columns. A vertically-mounted rotating drum is provided for pulling the ends of a sheave-threaded continuous cable and winding the ends of the cable thereon to shorten the cable span between two series of sheaves which are each mounted in vertically-spaced relation on one of the columns so as to raise or lower the movable column with respect to the fixed column. Vertical keys and keyways are provided between the center column and moving column and are assembled so as to achieve full key/keyway contact of the moving column in any position within the range of lift.

The cable-sheave-drum system of this invention provides for uniform load pickup around the column circumference from one common pulling point, thus equalizing load sharing and obviating any problem of timing the rotational movement of multiple independent raising devices such as jack screws. The drum is vertically oriented and positioned so that as the sheave means attached to the moving column moves vertically due to cable pull and shortening of the space between the series of sheaves, the rotating driven drum pulls the cable so both ends of the cable are laid in parallelism on the drum surface without any cable angle side pull or necessity of cable grooves on the drum surface. The cable angular approach on to the drum is the same through the complete vertical lift with each end of the cable being wound in juxtaposed side-by-side parallelism, i.e., in raising, the cable-feeding sheaves and the drum surface continually move relative to each other to a higher position where there is a cable-free surface on the drum. The cable-sheave-drum system has a lifting efficiency of from 70-80%. The system is very cost-effective being a simple mechanism with rather loose tolerance requirements which can quickly and dependably raise large heavy structures. For example, a 160-foot diameter thickener having a 12-foot fixed center column when employing 5.0 lift horsepower can lift approximately a gross weight of 500,000 pounds in rake and support structure at approximately 1 inch per minute.

BRIEF DESCRIPTION OF THE DRAWINGS

FIG. 1 is a partial cutaway cross-sectional side view of a sedimentation tank incorporating the present invention.

FIG. 2 is a partially cutaway side view of the cable lifting mechanism.

FIG. 3 is a partially cutaway top view of the lifting device taken on the line 3—3 in FIG. 2.

FIG. 4 is a sectional side view of a portion of the lifting device showing upper and lower stop means for the movable column.

DETAILED DESCRIPTION

Figure 5:
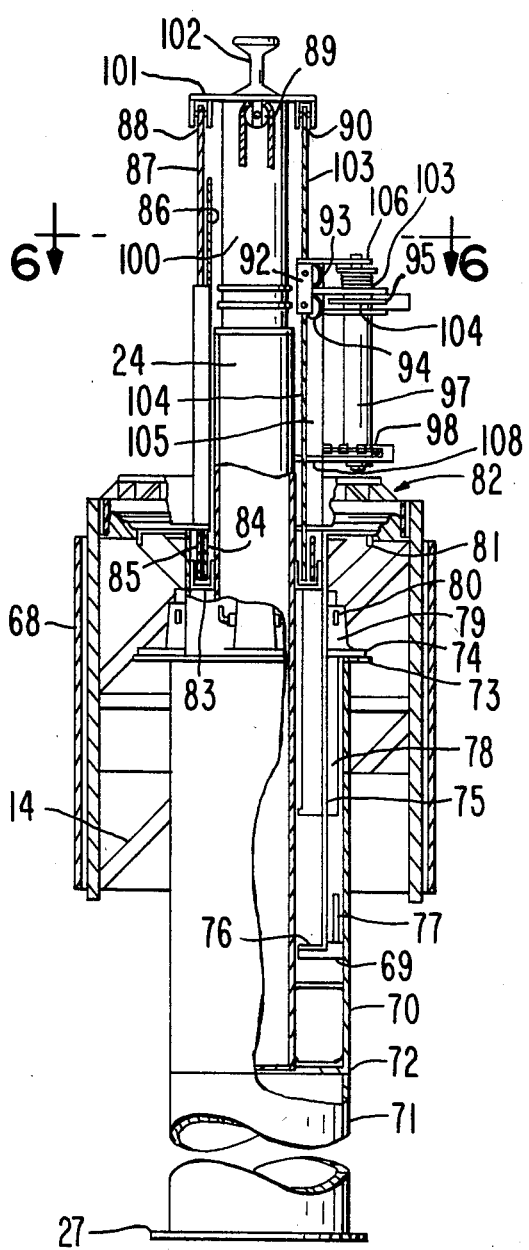
FIG. 5 is a partially cutaway side view of a second embodiment of the lifting device.

The apparatus of FIG. 1 involves a sedimentation device which may function in its normal manner as a liquids-solid separator either as a thickener where thickened solids are the desired product, as for example in minerals processing applications, or as a clarifier where clarified overflow is desired as in the waste water treatment field. The device includes a conventional cylindrical tank 10 having a flat inwardly inclined floor 11, a vertical side wall 12, a peripheral overflow trough or launder 13, a drive cage or torque tube 14 connected by an adapter ring 15 to a ring drive gear 16. Torque tube or cage 14 is connected at its bottom end to the inner periphery of rake support arms 17. A support bridge 18 is attached by crossbeam 26 to a column support 24 extending downwardly into a fixed center column 27. A movable column 28 telescopically extends downwardly within column 27. A support housing 29 is mounted on a top outwardly-extending flange 30 on column 28. Drive ring gear 16 and supporting bearing are mounted in housing 29. Ring gear 16 is driven by gear box 19 by a motor 32 through a gear reducer 20.

In operation the tank 10 is filled through feed pipe line 23 with a liquid containing suspended solids particles to a level equal to the height of a peripheral circular weir 25. The tank unit acts as a settling basin with solids falling to the tank bottom floor where they are raked by radially-extending conventional rake blades (not shown) into an annular sludge pocket 21 from where they are pumped or otherwise removed through sludge removal pipe 22. Clarified liquid overflows weir 25 into launder 13 and is removed by suitable piping (not shown). The rake assembly 17 and torque case 14 are driven by ring gear 16 through an adapter ring 15. The hereafter described lifting system 33 lifts the rake assembly 17 when it is overloaded due to accumulated solids, when it encounters an obstruction or otherwise when it is desired that the rakes be lifted. Upon activation, column 28 raises along with its associated drive housing 29, including the ring gear 16 and its drive unit 19, 20, 21, to the dotted line position 31. The attached torque cage 14 and rake arms 17 are simultaneously raised. Four keys and keyslots at the top location are welded to telescoping column 28 and to the top flange of fixed column 27, respectively. Four keys and keyslots at a bottom location are welded to the fixed column 27 and to the lower flange of the telescoping column 28, respectively. The keys and keyslots form a spline which restrains the telescoping column torsionally and laterally yet allows axial movement. The vertical distance of movement of flange 30, nominally 36 inches, is the lift height (L.H.) of the device. Crossbeam 26 on the top of support column 24 functions to give central support to fixed bridge 18.

FIG. 2 shows a cutaway view of a lifting device which is particularly usable with respect to large lifting devices. The term "large" in this context is used with respect to thickeners having a diameter of 100 to 250 feet or more. These devices employ a lifting horsepower of from 2 to about 5 HP and can lift from 300,000 to 500,000 pounds. In a 120-foot diameter device, the fixed column has a diameter of 8 feet and the height of the moving column is about 10 feet. A fixed center column 27 is provided within the tank as seen in FIG. 1. Normally center column 27 includes an extension 27a having a bottom flange 27b for bolting attachment to the bottom 11 of tank 10. A suitable field weld 27c connects the extension 27a to the factory-supplied center column section 27. Center column 27 has a peripheral top ledge 41 on which is mounted a series of sheave assemblies 40. A cross support member 37 is positioned at a lower portion of fixed column 27. Support beam 37 supports a lower support column 24 extending upwardly from inside column 27. Drum 38 is connected to beam 37 by drum support base 61 and upper support 35 and driven by reducer 48 through a chain drive 49. For clarity a motor is not shown. Sheave assembly 40 includes a sheave from which depends a generally vertical span of cable 39 in the annulus formed between fixed column 27 and a telescoping inner movable column 28. Ledge 41 on top of column 27 supports a series of sheaves 40 in each quadrant of its circular periphery. Internal ledge 44 of the movable column 28 supports a series of sheaves 53, 54 and 55 in each of its respective quadrants around the internal periphery. The exit and entrance portions of each of the sheaves extend in the annulus 45 between the fixed column 27 and movable column 28.

Cable 39 is threaded from an upper sheave to a lower sheave to an upper sheave to a lower sheave, etc. as one proceeds around the periphery of the two columns. The ends of the continuous cable are passed through feed sheaves 42 and attached to drum 38. The cable ends 46, 47 come off the two feed sheaves 42 appropriately positioned to the drum, and are wrapped on the rotating vertical drum surface in parallelism. As the respective ends 46, 47 of the cable 39 are wrapped on the drum surface, the overall cable length between the sets of sheaves becomes shortened, and the span between the upper and lower series of sheaves is also shortened. The lower cable sheave assemblies 53, 54 and 55 and the movable column 28 to which they are attached are raised with respect to the vertically fixed drum surface and thus lay down two helical lays of cable in side-by-side parallelism as the movable column 28 proceeds upwardly. Thus, when the movable column 28 is in the fully up position, in a typical application there will be upwards of 17 wraps of cable around the periphery of the vertical drum surface.

When it is desired to lower the movable column 28 and its associated rake holding arms and drive structure, the lift motor is reversed and the wraps of cable are payed off the drum surface each lay after the other as the movable column 28 proceeds downwardly. In both up and down movement the array of sheave assemblies particularly feed sheaves 42 are juxtaposed to the position on the drum where the cable is being payed off the drum surface onto such sheaves.

The movable column 28 is guided in its up and down movement by spaced multiple keys 60 extending vertically on the outside periphery of the moving column 28 which pass through key guideways attached to the inner periphery of the fixed column 27. A guideway casing 51 surrounds the guideway and a lubrication fitting 52 is provided to lubricate the key and keyway. A lubricant supply tube 59 is attached to each of the lube ports 52.

Grating 67 is provided on an upper inner ledge and lower inner ledge of column 28 which allows access to ladder 36 and affords safety to those workmen and operators in the vicinity of the rake arm drive and the lift drum drive. A suitable annular splash plate 68 depends from the flange 30 exterior to both of the columns 27 and 28 to prevent ingress of liquid into the area of the sheaves 40 and the upper guideways.

FIG. 3 shows four keys 60 and guideways 50 at 90° spacing around the periphery of the respective fixed column 27 and movable column 28. Interposed between each key and keyway combination are an upper series of sheaves, for example, sheaves 40, which extend in the annulus 34 between the inner and outer columns 28 and 27. It is to be noted that directly above the three sheave assemblies 53, 54 and 55 are four sheave assemblies 40 located in each quadrant which allow for the complete threading of the cable between the various sets of sheave assemblies and provide uniform load distribution on columns 27 and 28. In such arrangement, assembly 53 and 55 each have two sheaves on a bracket and assembly 54 has one sheave. This is similar to the schematic of FIG. 8 wherein sheaves 4a–d correspond to sheaves 40 and 5a and 3a correspond to dual assembly 53 and sheave 5b represents sheave 54. FIG. 3 shows drum 38 receiving cable ends 46 and 47 in the same rotary direction so that the respective cable ends are laid down in side-by-side parallel relationship to each other on the drum surface. Upper bearing mount 35 of drum 38 may be attached to support column 24. Extending between the shown two support columns 24 is an access ladder 36 which extends from above the top of the ring gear unit 16 to the bottom support 37 of the fixed column 27. Limit stops 62 and 63 are provided on the column 24 which is actuatable at the extremes of the up and down positions of the ledge 44 of the movable column 28. Drum sprocket 64 connected to reducer 48 drives chain 49 which in turn drives a sprocket wheel 64a on drum 38.

FIG. 4 shows ladder 36 extending from support column 24 and illustrates top and bottom limit switches 62 and 63, respectively, extending from the support column 24. Actuation of top limit switch 62 by the upper edge of ledge 44 of movable column 28 deactuates the motor and stops drum rotation leaving the movable column 28 in the up position. Likewise, actuation of the lower limit switch 63 by the bottom edge of ledge 44 deactuates the motor and stops drum 38 in the down position. To prevent further downward movement in event of limit switch failure causing actual contact of the rakes with the tank bottom a positive lower mechanical stop 66 is provided extending from support beam 37 upwardly to a position just below lower limit stop 63.

FIG. 5 is a alternative embodiment of the lifting device particularly useful in thickeners of so-called intermediate size, namely those having outside diameters of from 60 to 100 feet. These devices employ a lifting horsepower of from 0.75 to about 2.0 and can lift upwards of 200,000 pounds. In an 84-foot diameter device of this embodiment, the fixed column has a diameter of approximately five feet and the height of the moving column is approximately 9 feet. In FIG. 5 the sheave assemblies are provided above the top of fixed column 70 rather than oriented within the annulus between the fixed and moving columns as in FIG. 2. This permits as appreciably smaller diameter fixed column 70 affording greater useful tank capacity. Column 70 has a downward extension 71 joined by field weld 72. Flange 27b of extension 71 is attached to the bottom of the sedimentation tank as explained with respect to FIG. 2.

Fixed column 70 has an outwardly extending peripheral flange 73 which supports a flange 74 of a keyway housing. A keyway 79 is provided through which slides key 78 attached to the outside periphery of telescoping column 75. Key 78 slides through keyway 79 at the upper portion of column 70 and a lower guide 69 at a lower portion of column 70, mounted to a bottom flange 76 of movable column 75. Suitable lubrication means 80 are provided to lubricate the key and keyway within each housing. Lubrication means 77 lubricates lower guide 69 against the inner wall of column 70.

Drive unit 82 is positioned on an outwardly extending peripheral ledge 81 extending from the top of column 75. Drive unit 82 rotates depending torque cage 14 which supports the rake arms as seen in FIG. 1. A splash shield 68 may also be provided in this embodiment. Support column 24 extends from an internal horizontal support member adjacent the bottom of the fixed column 70 adjacent the field weld 72 position.

Post 24 contains an upward extension 100 including a bridge-mounting crossbeam 102 extending above the drive unit 82. Upper sheave assemblies 101 are positioned on a horizontal circular plate at the top of the bridge and support column extension 100 and comprises a series of sheaves 88, 89 and 90 depending from the plate periphery. Cable spans 86 and 87 extend from sheaves 88–90 to lower sheave assemblies containing dual sheaves 84, 85 mounted on an inner ledge 83 below the upper extremity of telescoping column 75.

After being threaded through sheaves 88, 85, 89, etc., and back to sheave 90 at the top, cable ends 103 and 104 are passed into a fixed (nonrising) idler sheave assembly 92 containing upper and lower idler sheaves 93 and 94. Cable end 103 passes through sheave 93 where it is would on the surface of drum 97. Cable end 104 passes around idler sheave 94 and is connected to a feed idler sheave 95 on the opposite side of drum 97 where the cable end 104 is would next to and parallel to cable end 103. As drum 97 is rotated, the overall cable spans 86 and 87 are shortened between the upper and lower sets of sheaves resulting in an upward movement of column 75 and the drum 97 so that succeeding lays of cable 103 and 104 are wound on the cable drum in positions lower than the preceding turns on the drum as the telescoping column is moved upwardly with respect to fixed column 70.

Drive reducer 99 drives chain 98 which in turn rotates drum 97. Drum 97 and its associated drive means are mounted on a pair of brackets 106 and 108 extending outwardly from vertical bracket 105 which extends upwardly from flange 81 on the telescoping column 75.

Figure 6:
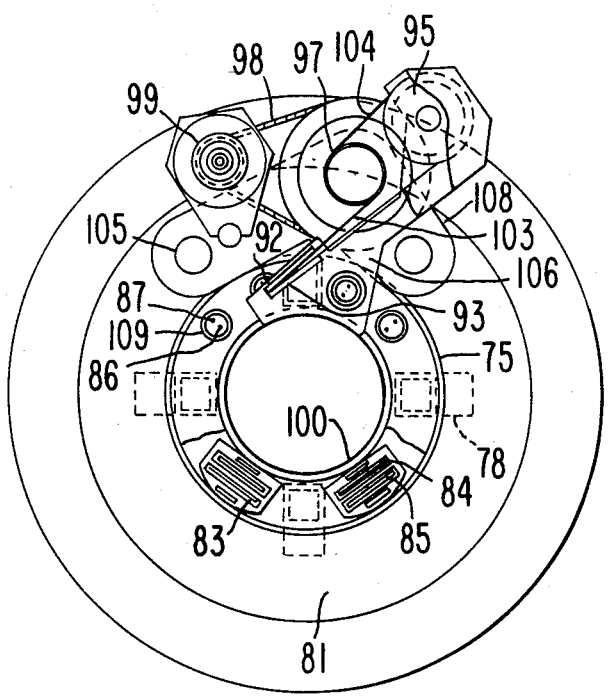
FIG. 6 is a partially cutaway top view of the lifting device taken on the line 6—6 of FIG. 5.

FIG. 6 taken on the line 6—6 of FIG. 5 looking downwardly at the top end of the cable-lifting mechanism and the associated drum 97 shows cable end 103 being fed from idler sheave 93 to the drum surface in parallelism with cable end 104 which enters the drum surface of drum 97 from idler sheaves 94 and 95. Sheave 93 is part of idler assembly 92 situated between the post extension 100 and the vertical drum 97. Double sheaves 83 and 84 are provided so as to provide apportionment of the loading over a greater number of sheaves in the limited linear spacing around the periphery of the smaller movable column 75 and to fit 8 sheaves in the space available and have them located directly below the sheaves above them from which they receive and send cable. A shield 109 is provided around the cable spans 86 and 87 and the other cable spans between the respective upper and lower sheave assemblies so as to protect from ingress of moisture and contaminants and to guard against accidents to operating personnel.

Figure 7:
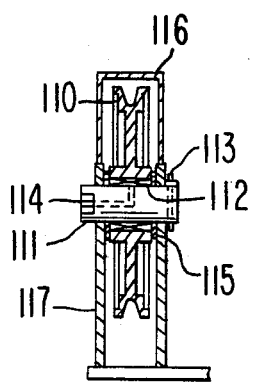
FIG. 7 is a detailed end view of a sheave assembly used in the lifting device.

FIG. 7 is a detailed view of a typical sheave assembly used with this invention. A sheave 110 is rotatively mounted on a hardened shaft 111 and rotates on a roller bearing 112 between the inner periphery of the sheave bore and the outside diameter of the shaft 111. A retainer pin 113 retains the sheave in position on the shaft. The grease fitting 114 with a suitable internal passageway is provided for lubricating the roller bearing. A grease retainer 115 seals the roller bearing ends and the peripheral edges of sheave 110. A cable shield 116 surrounds the sheave 110 except for ingress and egress apertures allowing for threading and inward and outward movement of the cable. A suitable support bracket 117 is mounted to the particular ledge of either the fixed or movable columns of the invention.

Figure 8:
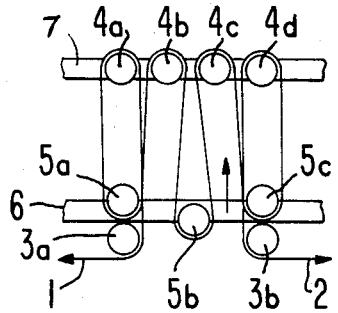
FIG. 8 is a schematic view of the sheave and cable system used in the lifting device of FIGS. 2 and 3.

FIG. 8 is a schematic view of the threading of the cable through the upper and lower series of sheaves. Pull of the cable is provided at points 1 and 2 by the drum shown in the previous Figures. Cable ends 1 and 2 are connected to one end of the drum surface. Cable end 1 passes over idler sheave 3a, progresses to upper sheave 4a, passes downward to sheave 5a of the lower set of sheaves, returns upwardly to another upper sheave 4b and back down to a lower sheave 5b. Again, the cable moves upwardly to an upper sheave 4c, then proceeds to a lower sheave 5c and then to an upper sheave 4d and downwardly again to idler sheave 3b where it is now cable end 2. Rotation of the drum to wind up ends 1 and 2 thereon effects shortening of the cable spans between the fixed upper series of sheaves 4a, 4b, 4c and 4d and the lower series of sheaves 5a, 5b, 5c, 3a and 3b such that the lower span of sheaves affixed to member 6 are moved upwardly towards the upper series of sheaves held by fixed member 7. Since the lower set of sheaves 5a–5c, as explained with regard to FIGS. 2 and 5, are contained on the movable column, the movable column thus moves upwardly and lifts the rake structures attached to such moving column.

It is to be understood that the ring gear in each of the modifications may take different forms in relation to its attachment to the torque cage 14. The ring gear functions to rotate the rake arms so that blades on the arms move sediments towards the sludge pockets in tank 10. Rotary movement of the torque cage 14 and the attached rake arms 17 are independent from the raising and lowering of the columns with respect to each other and the attendant raising and lowering of the drive units and attached torque cage and rake arms.

The above description of embodiments of this invention is intended to be illustrative and not limiting. Other embodiments of this invention will be obvious to those skilled in the art in view of the above disclosure.

We claim:

1. A lifting mechanism for a raking structure in a solids-liquid sedimentation tank comprising:
   a fixed center column adapted to extend from the bottom of a sedimentation tank to above the upper level of liquid to be contained in said tank;
   a concentric movable column in telescoping relation with said center column, said movable column being adapted to mount said raking structure; and
   means for moving said movable column telescopically with respect to said center column, said means including:
   a first series of sheaves fixed to said movable column;
   a second series of sheaves in fixed relation with said fixed center column;
   drum means in fixed relation to one of said columns;
   a continuous cable extending threadably between each of the sheaves in said first and second series of sheaves; and
   means including said drum means for pulling and shortening the effective span length of said cable between said first and second series of sheaves to raise said movable column with respect to said fixed column.

2. The invention of claim 1 in which said movable column is interior of said fixed column.

3. The invention of claim 1 in which said drum means is vertically-mounted and a cable-receiving drum surface extends at least a distance equal to the desired height of lift of the raking structure.

4. The invention of claim 1 including support means within such fixed column for mounting said drum means.

5. The invention of claim 1 including support means extending exteriorly above and fixed with respect to said movable column for mounting said drum means.

6. The invention of claim 1 further including means on said movable column for supporting a drive unit for said raking structure.

7. The invention of claim 6 further including rake rotation means extending downwardly from a top portion of said drive unit.

8. The invention of claim 6 further including support means attached to said moving column and extending above said drive unit for supporting said drum means, said drum means being vertically movable in unison with said movable column.

9. The invention of claim 8 further including feed sheave means in cable connection to said first and second sheave means for directing said cable onto said drum means.

10. The invention of claim 9 in which said feed sheave means includes an idler sheave and wherein said feed sheave means directs opposite ends of said cable means onto said drum means in side-by-side juxtaposed parallelism.

11. The invention of claim 1 including means forming a series of vertically-extending parallel keys and keyways on facing surfaces of said fixed column and said movable column.

12. The invention of claim 11 in which said keys and keyways are spaced at 90° portions around the periphery of said columns.

13. The invention of claim 11 wherein said keys and keyways are laterally spaced from said first and second series of sheaves, a portion of said first and second series of sheaves extending in an annulus between said facing surfaces of said columns and being positioned in the spaces between each of the series of said keys and keyways.

14. The invention of claim 1 in which said first series of sheaves comprises a lower series of sheaves spaced around a peripheral portion of said movable column and said second series of sheaves comprises an upper series of sheaves extending peripherally around said fixed column above said first series of sheaves, each of the sheaves in one series of sheaves being in general vertical alignment with one of the sheaves in the other series of sheaves whereby said cable extends in generally vertical spans between the respective upper and lower series of sheaves.

15. The invention of claim 14 in which said first series of sheaves is attached to a bottom peripheral portion of said movable column and said second series of sheaves is attached to a top peripheral portion of said fixed column and wherein said cable extends generally vertically in a vertically-extending annulus between said columns.

16. The invention of claim 14 in which said first series of sheaves is attached to an upper peripheral portion of said movable column and said second series of sheaves is attached to an upstanding support column extending from said fixed column above said movable column and fixed with respect to said fixed column.

17. The invention of claim 1 in which first series of sheaves comprises pairs of double sheaves.

18. The invention of claim 1 wherein said first series of sheaves is connected to a bottom peripheral portion of said movable column and said drum means extends vertically juxtaposed to said first series of sheaves over a vertical distance representing a portion of the vertical lift distance of said movable column.

19. The invention of claim 18 wherein said second series of sheaves is connected to a top portion of said fixed column and wherein said cable extends vertically between said first and second series of sheaves in an annulus between said columns.

20. The invention of claim 1 further including a torque cage surrounding said fixed column and connected to said movable column and means mounted on said movable column for rotating said cage, whereby vertical movement of said movable column vertically moves said torque cage, said torque cage being adapted to transmit rotation to rake arms fixedly connected to said cage independent of vertical lifting movement of said cage and arms.

21. A lifting mechanism for raking structure in a solids-liquid sedimentation tank comprising:
 a fixed center column adapted to extend from the bottom of a sedimentation tank to above the upper level of liquid to be contained in said tank;
 a concentric movable column in telescoping relation within said center column, said movable column being adapted to mount said raking structure; and
 means for moving said movable column with respect to said center column, said means including:
  a first series of peripherally-spaced sheaves connected to a bottom portion of said movable column;
  a second series of peripherally-spaced sheaves connected to a top portion of said fixed center column and vertically-spaced from said first series of sheaves;
  vertical drum means connected to said fixed column and juxtaposed to two of the first series of sheaves;
  a continuous cable extending generally vertically between said first and second series of sheaves alternating between sheaves of the first and second series of sheaves; and
  means including said drum means for pulling the ends of said cable and winding said cable on said drum means to shorten the effective span distance between said first and second series of sheaves so as to raise said movable column with respect to said fixed column.

22. The invention of claim 21 further including spaced multiple keys and keyways vertically-extending on facing surfaces of said fixed and movable columns and wherein multiple sheaves within said first and second series of sheaves extend around the perimeter of said columns between said keys and keyways.

23. A lifting mechanism for raking structure in a solids-liquid sedimentation tank comprising:
 a fixed center column adapted to extend from the bottom of a sedimentation tank to above the upper level of liquid to be contained in said tank;
 a concentric movable column in telescoping relation within said center column, said movable column being adapted to mount said raking structure; and
 means for moving said movable column with respect to said center column, said means including:
  a first series of sheaves connected to a upper portion of said movable column;
  a support column attached to and extending upwardly from said fixed column;
  a second series of sheaves connected to a top portion of said support column and vertically-spaced from said first series of sheaves;
  vertical drum means connected to a top portion of said movable column;
  a continuous cable extending generally vertically between said first and second series of sheaves alternating between sheaves of the first and second series of sheaves; and
  means including said drum means for pulling the ends of said cable and winding said cable on said drum means to shorten the effective span distance between said first and second series of sheaves so as to raise said movable column with respect to said fixed column.

24. The invention of claim 23 further including spaced multiple keys and keyways vertically extending on facing surfaces of said fixed and movable columns, said first and second series of sheaves extending above said keys and keyways and extending around the perimeter of said movable column and around the perimeter of a horizontal plate attached to said support column.

25. The invention of claim 23 including a third series of sheaves juxtaposed vertically with said vertical drum means, said third series of sheaves directing the ends of said cable into parallel side-by-side loops of cable windable on a cylindrical surface of said drum means as said drum means rotates and moves vertically as the effective span distance between said first and second series of sheaves is shortened.

26. The invention of claim 23 including cable shields extending upwardly from upper portion of said movable column to said second series of sheaves.

* * * * *